United States Patent
Coste et al.

(10) Patent No.: US 11,987,671 B2
(45) Date of Patent: May 21, 2024

(54) ELASTOMER MIX COMPRISING PLLA AND PDLA

(71) Applicant: COMPAGNIE GENERALE DES ETABLISSEMENTS MICHELIN, Clermont-Ferrand (FR)

(72) Inventors: Nathalie Coste, Clermont-Ferrand (FR); Lise Maisonneuve, Clermont-Ferrand (FR); Gilles Mioche, Clermont-Ferrand (FR); Severin Dronet, Clermont-Ferrand (FR); Julien Cayuela, Saint-Saulve (FR); Bertrand De Backer, Mons (BE); Philippe Ghislain Dubois, Ciplet (BE)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 584 days.

(21) Appl. No.: 17/251,544

(22) PCT Filed: Jun. 18, 2019

(86) PCT No.: PCT/FR2019/051477
§ 371 (c)(1),
(2) Date: Dec. 11, 2020

(87) PCT Pub. No.: WO2019/243724
PCT Pub. Date: Dec. 26, 2019

(65) Prior Publication Data
US 2021/0253801 A1    Aug. 19, 2021

(30) Foreign Application Priority Data
Jun. 19, 2018 (FR) ...................... 1855392

(51) Int. Cl.
*C08G 81/02* (2006.01)
*B60C 1/00* (2006.01)
(Continued)

(52) U.S. Cl.
CPC .......... *C08G 81/027* (2013.01); *B60C 1/0016* (2013.01); *C08G 63/08* (2013.01);
(Continued)

(58) Field of Classification Search
CPC .......... C08L 67/04; C08L 9/00; C08L 87/005; C08L 53/00; C08G 63/08
See application file for complete search history.

(56) References Cited

U.S. PATENT DOCUMENTS

| 6,114,495 A | 9/2000 | Kolstad et al. |
| 6,143,863 A | 11/2000 | Gruber et al. |

(Continued)

FOREIGN PATENT DOCUMENTS

| EP | 912624 A1 | 5/1999 |
| JP | 2012158738 A * | 8/2012 |

(Continued)

OTHER PUBLICATIONS

Machine translation of JP-2012158738-A obtained from Patentscope. (Year: 2012).*

(Continued)

*Primary Examiner* — Kregg T Brooks
*Assistant Examiner* — David R. Foss
(74) *Attorney, Agent, or Firm* — VENABLE LLP (57) ABSTRACT

An elastomeric mixture comprises at least: one diene elastomer/polylactide copolymer A1 comprising a polylactide block PLLA or PDLA, where appropriate one or more other polylactide blocks which are all PLLA when the first block is PLLA or which are all PDLA when the first block is PDLA, the mass percentage of the polylactide block(s)

(Continued)

being between 10% and 50% by weight relative to the weight of the copolymer A1, and a diene elastomer/polylactide copolymer B1 the mass percentage of the polylactide block(s) in said copolymer B1 being between 10% and 50% by weight relative to the weight of the copolymer B1, or a polylactide B2, or a mixture of said copolymer B1 and of said polylactide B2, the names PLLA and PDLA denoting a chain consisting of units of formula (I) —[CH(CH$_3$)—C(O)—O]— (I), of which at least 70% by weight are, respectively, of L and D configuration.

15 Claims, 1 Drawing Sheet

(51) Int. Cl.
    *C08G 63/08*     (2006.01)
    *C08L 9/00*     (2006.01)
    *C08L 9/06*     (2006.01)
    *C08L 53/00*     (2006.01)
    *C08L 67/04*     (2006.01)
    *C08L 87/00*     (2006.01)

(52) U.S. Cl.
    CPC . *C08L 9/06* (2013.01); *C08L 9/00* (2013.01); *C08L 53/00* (2013.01); *C08L 67/04* (2013.01); *C08L 87/005* (2013.01); *C08L 2205/025* (2013.01)

(56) References Cited

U.S. PATENT DOCUMENTS

| | | | |
|---|---|---|---|
| 6,344,506 | B2 | 2/2002 | Vasseur |
| 8,763,660 | B2 | 7/2014 | Araujo Da Silva et al. |
| 8,833,417 | B2 | 9/2014 | Araujo Da Silva et al. |
| 9,487,614 | B2 | 11/2016 | Matmour et al. |
| 10,266,690 | B2 | 4/2019 | Coupin |
| 11,155,665 | B2 | 10/2021 | Dronet et al. |
| 2001/0056138 | A1 | 12/2001 | Vasseur |
| 2009/0165919 | A1 | 7/2009 | Araujo Da Silva et al. |
| 2010/0063189 | A1 | 3/2010 | Araujo Da Silva et al. |
| 2011/0203712 | A1 | 8/2011 | Araujo Da Silva et al. |
| 2011/0303338 | A1 | 12/2011 | Araujo Da Silva et al. |
| 2015/0031810 | A1 | 1/2015 | Araujo Da Silva et al. |
| 2015/0299367 | A1 | 10/2015 | Matmour et al. |
| 2016/0017134 | A1 | 1/2016 | Desille |
| 2017/0044362 | A1 | 2/2017 | Coupin |

FOREIGN PATENT DOCUMENTS

| | | |
|---|---|---|
| WO | 98/02480 A1 | 1/1998 |
| WO | 99/02590 A1 | 1/1999 |
| WO | 2007/121936 A1 | 11/2007 |
| WO | 2008/055683 A1 | 5/2008 |
| WO | 2009/138460 A1 | 11/2009 |
| WO | 2014/095925 A1 | 6/2014 |
| WO | 2015/165918 A1 | 11/2015 |

OTHER PUBLICATIONS

R. Mildenberg, et al., Hydrocarbon Resins, VCH, New York, chapter 5, pp. 141-146 (1997).
N.E. Kamber, et al., "Organocatalytic Ring-Opening Polymerization", Chem. Rev. 2007, 107, 5813-5840.
M.K. Kiesewetter, et al., "Cyclic Guanidine Organic Catalysts: What Is Magic About Triazabicyclodecene?", J. Org. Chem. 2009, 74, 9490-9496.
S. Naumann, et al., "Highly Polarized Alkenes as Organocatalysts for the Polymerization of Lactones and Trimethylene Carbonate", ACS Macro Lett. 2016, 5, 134-138.
A.R. Shultz, et al., "Thermo-Optical and Differential Scanning Calorimetric Observations of Mobility Transitions in Polystyrene-Poly(2,6-Dimethyl-1,4-Phenylene Oxide) Blends", J. Appl. Polymer. Sci., vol. 16, pp. 461-471 (1972).
International Search Report dated Sep. 6, 2019, in corresponding PCT/FR2019/051477 (4 pages).

* cited by examiner

ELASTOMER MIX COMPRISING PLLA AND PDLA

BACKGROUND

The present invention relates to an elastomeric mixture comprising both poly-L-lactide (abbreviated as PLLA) and poly-D-lactide (abbreviated as PDLA), one of the two from among PLLA and PDLA in the form of a block covalently bonded to a diene elastomer and the other in the form of a block covalently bonded to another diene elastomer or in the form of a homopolymer. The diene elastomer comprising at least one polylactide block combines an elastomeric backbone and one or more rigid blocks and thus has thermoplastic elastomer properties. The invention also relates to a rubber composition which comprises such an elastomeric mixture and to a tyre, at least one of the constituent elements of which comprises such an elastomeric mixture or such a composition.

Various strategies are possible for modifying the properties of synthetic elastomers present in rubber compositions for tyres. Among these, diene elastomers may be reacted with other polymers.

The Applicant has more particularly focused on diene elastomer/polylactide copolymers, comprising an elastomeric backbone and polylactide blocks on the side or at the ends. These copolymers thus have thermoplastic elastomer (TPE) properties.

Materials with thermoplastic elastomer properties combine the elastic properties of the elastomers and the thermoplastic nature, namely the ability to reversibly melt and harden under the action of heat, of the polylactide blocks.

In the context of the invention, for the thermoplastic block, thermoplastic polymer compositions with a melting point of greater than or equal to 150° C., advantageously ranging from 150° C. to 250° C., are sought.

Polylactic acid has a melting point which falls within this range.

A mixture comprising PLLA and PDLA has mechanical and thermal properties that are different from those of a mixture comprising PLLA alone or PDLA alone. In particular, PDLA and PLLA may together form a stereocomplex having a higher melting point than that of PLLA alone or PDLA alone.

Moreover, in the context of the invention, a material which can be manufactured by a continuous, flexible and low-cost process, for instance by reactive extrusion, is also sought.

Reactive extrusion is a process used mainly for thermoplastics, thus polymers with high glass transition temperatures or melting points.

Polylactide comprises units of formula (I):

—[CH(CH₃)—C(O)—O]—           (I)

in which the asymmetric carbon may be of L (also denoted S) or D (also denoted R) configuration.

In the present description, the names PLLA and PDLA denote a chain consisting of units of formula (I), of which at least 70% by weight, advantageously at least 90% by weight, are of L and D configuration, respectively. It will be understood that the remaining units are units of formula (I) having the opposite configuration.

Polylactide is notably obtained by ring-opening polymerization of lactide.

In the context of the invention, the term "lactide" means the cyclic diester of lactic acid, i.e. 2-hydroxypropionic acid. Lactide corresponds to formula (II) below:

(II)

The term "L-lactide" or "lactide of L configuration" means the stereoisomer (S,S)-lactide. The term "D-lactide" or "lactide of D configuration" means the stereoisomer (R,R)-lactide.

According to the present invention, the term "diene elastomer/polylactide copolymer" means a copolymer comprising at least one diene elastomer block covalently bonded to at least one polylactide block. In particular, the copolymer may comprise a diene elastomer block covalently bonded, via its end(s), to one or two polylactide blocks. In another variant, the copolymer may be a polymer of comb type comprising a diene elastomer block, forming the backbone of the comb copolymer, covalently bonded to several polylactide blocks distributed along the backbone.

In the present description, the term "along the backbone" or "along the chain", with reference to a polylactide side block of the copolymer, should be understood as meaning that the copolymer comprises polylactide side groups at several places on the constituent elastomer chain of the backbone. This includes the end(s) of the chain but is not limited to these locations. When a polylactide block is present at at least one chain end, the copolymer advantageously also comprises at least one other polylactide side block in another position in the chain.

In the present description, the term "elastomeric mixture" should be understood as meaning that the mixture has the properties of an elastomer, i.e. elasticity properties comparable to those of a rubber.

The molar masses are determined by the methods described in the "Measurements and tests used" section, via the polystyrene equivalent size exclusion chromatography (SEC) technique. In the present description, unless expressly indicated otherwise, all the molar masses are number-average molar masses.

In the present description, unless expressly indicated otherwise, all the percentages (%) indicated are weight percentages.

Moreover, for the purposes of the invention, the term "phr" means parts by weight per hundred parts of total elastomer, i.e. of elastomeric mixture.

In the present description, any range of values denoted by the expression "between a and b" represents the range of values extending from more than "a" to less than "b" (i.e. limits a and b excluded), while any range of values denoted by the expression "from a to b" means the range of values extending from "a" up to "b" (i.e. including the strict limits a and b).

The expression "composition based on" should be understood as meaning a composition comprising the mixture and/or the reaction product of the various constituents used, some of these base constituents being capable of reacting or intended to react with each other, at least partly, during the various phases of manufacture of the composition, in particular during the crosslinking or vulcanization thereof.

The compounds mentioned in the description and participating in the preparation of rubber compositions or polymers may be of fossil or biobased origin. In the latter case, they may be partially or totally derived from biomass or may be obtained from renewable starting materials derived from biomass. Polymers, plasticizers, fillers and the like are notably concerned.

I— SUMMARY

One subject of the invention is an elastomeric mixture comprising at least:
as polymer A),
  at least one diene elastomer/polylactide copolymer A1, the copolymer A1 comprising
    a polylactide block PLLA or PDLA, referred to as the first block,
    where appropriate, one or more other polylactide blocks which are all PLLA when the first block is PLLA or which are all PDLA when the first block is PDLA,
    the mass percentage of the polylactide block(s) in said copolymer A1 being between 10% and 50% by weight, relative to the weight of the copolymer A1, and
as polymer B),
  a diene elastomer/polylactide copolymer 1, the copolymer 1 comprising
    a polylactide block, referred to as the second block, which is PLLA when, in the copolymer A1, the first block is PDLA or which is PDLA when, in the copolymer A1, the first block is PLLA,
    where appropriate, one or more other polylactide blocks which are all PLLA when said second block is PLLA or which are all PDLA when said second block is PDLA,
    the mass percentage of the polylactide block(s) in said copolymer 1 being between 10% and 50% by weight, relative to the weight of the copolymer E1,
  or a polylactide B2 which is
    PLLA when, in the copolymer A1, the first polylactide block is PDLA, or
    PDLA when, in the copolymer A1, the first polylactide block is PLLA,
  or a mixture of said copolymer 1 and of said polylactide B2 the names PLLA and PDLA denote a chain consisting of units of formula (I)

—[CH(CH$_3$)—C(O)—O]—  (I).

of which at least 70% by weight are, respectively, of L and D configuration.

Advantageously, the names PLLA and PDLA denote a chain consisting of units of formula (I), of which at least 90% by weight are of L and D configuration, respectively.

In the elastomeric mixture, the mass content of units of formula (I) is advantageously less than 50% by weight relative to the total weight of the elastomeric mixture.

The copolymer A1 and/or 1 advantageously comprises at least one diene elastomer block with a number-average molar mass Mn of greater than 25 000 g/mol.

In one variant, the polymer A comprises a mixture of a copolymer A1 and of a polylactide A2, said polylactide A2 being:
  PLLA when, in the copolymer A1, the first polylactide block is PLLA,
  or PDLA when, in the copolymer A1, the first polylactide block is PDLA.

The polylactide A2) and/or E2) advantageously has a number-average molar mass Mn of less than 150 000 g/mol.

The polymer B) advantageously comprises at least said copolymer E1.

The copolymer A1 or the copolymer 1 is advantageously chosen from:
  a triblock, of structure PLLA-diene elastomer-PLLA or of structure PDLA-diene elastomer-PDLA,
  a diblock, of structure PLLA-diene elastomer or of structure PDLA-diene elastomer,
  a comb copolymer, having a diene elastomer backbone and PLLA side blocks, or, respectively, PDLA side blocks, distributed along the backbone.

In one embodiment, the copolymer A1 is a triblock with a number-average molar mass Mn ranging from 50 000 g/mol to 300 000 g/mol.

In another embodiment, the copolymer A1 is a comb copolymer with a number-average molar mass Mn ranging from 100 000 g/mol to 600 000 g/mol.

In another embodiment, the copolymer A1 is a diblock with a number-average molar mass Mn ranging from 25 000 g/mol to 200 000 g/mol.

In one embodiment, the copolymer 1 is a triblock with a number-average molar mass Mn ranging from 50 000 g/mol to 300 000 g/mol.

In another embodiment, the copolymer 1 is a comb copolymer with a number-average molar mass Mn ranging from 100 000 g/mol to 600 000 g/mol.

In another embodiment, the copolymer 1 is a diblock with a number-average molar mass Mn ranging from 25 000 g/mol to 200 000 g/mol.

In the copolymer A1 and/or in the copolymer 1, the diene elastomer is advantageously chosen from polybutadienes (abbreviated as "BRs"), synthetic polyisoprenes (IRs), natural rubber (NR), butadiene copolymers, isoprene copolymers, copolymers of ethylene and diene, and mixtures of these polymers.

The copolymers A) and B) represent at least 30% by weight of the elastomeric mixture, advantageously at least 50% by weight of the elastomeric mixture, even more advantageously at least 90% by weight of the elastomeric mixture.

A subject of the invention is also a rubber composition which comprises the elastomeric mixture according to the invention and an additive. Advantageously, said elastomeric mixture represents at least 30% by weight of the rubber composition.

A subject of the invention is also a tyre, one of the constituent elements of which comprises an elastomeric mixture according to the invention or a rubber composition according to the invention. Advantageously, said constituent element is a tread.

III— DETAILED DESCRIPTION OF THE INVENTION

The elastomeric mixture according to the invention comprises at least two polymers, polymers A and B, one comprising the polylactide of L configuration, PLLA, when the other comprises the polylactide of D configuration, PDLA.

In addition, as polymer A), the elastomeric mixture comprises at least one diene elastomer/polylactide copolymer A1, the copolymer A1 comprising a polylactide block PLLA or PDLA, referred to as the first block, where appropriate, one or more other polylactide blocks which are all PLLA when the first block is PLLA or which are all PDLA when the first block is PDLA, the mass percentage of the polylactide block(s) in said copolymer A1 being between 10% and 50% by weight, relative to the weight of the copolymer A1.

The polymer A may also comprise a mixture of a copolymer A1 and of a polylactide A2, said polylactide A2 being:

PLLA when, in the copolymer A1, the first polylactide block is PLLA, or

PDLA when, in the copolymer A1, the first polylactide block is PDLA.

The elastomeric mixture comprises, as polymer B), a diene elastomer/polylactide copolymer 1, the copolymer B1 comprising a polylactide block, referred to as the second block, which is PLLA when, in the copolymer A1, the first block is PDLA or which is PDLA when, in the copolymer A1, the first block is PLLA, where appropriate, one or more other polylactide blocks which are all PLLA when in said second block is PLLA or which are all PDLA when said second block is PDLA, the mass percentage of the polylactide block(s) in said copolymer 1 being between 10% and 50% by weight, relative to the weight of the copolymer 1, and or a polylactide B2 which is PLLA when, in the copolymer A1, the first polylactide block is PDLA, or PDLA when, in the copolymer A1, the first polylactide block is PLLA, or a mixture of said copolymer 1 and of said polylactide B2.

Thus, the L or D configuration of the polylactide of the polymer B is chosen as a function of the configuration of the polylactide of the polymer A.

Advantageously, in the elastomeric mixture, the mass content of units of formula (I) is less than 50% by weight relative to the total weight of the elastomeric mixture. More advantageously, in the elastomeric mixture, the mass content of units of formula (I) is less than 45% by weight and even more advantageously less than 40% by weight relative to the total weight of the elastomeric mixture.

Advantageously, in the elastomeric mixture, the mass content of units of formula (I) is greater than 10% by weight relative to the total weight of the elastomeric mixture.

Advantageously, in the elastomeric mixture, all the units of formula (I) are provided by the polymers A and B.

In the elastomeric mixture, the mass ratio of the [units of formula (I) of L configuration]/[units of formula (I) of D configuration] is advantageously between 10/90 and 90/10.

Advantageously, in the elastomeric mixture, the polymer A/polymer B mass ratio is between 10/90 and 90/10. Preferably, the polymer A/polymer B mass ratio ranges from 75/25 to 25/75.

The elastomeric mixture may also include at least one (i.e. one or more) additional diene elastomer.

Advantageously, the elastomeric mixture comprises at least 30% of polymers A) and B), preferentially at least 50%, even more preferentially at least 90% by weight of the elastomeric mixture.

The elastomeric mixture according to the invention has the particular feature of comprising both PLLA and PDLA, one of the two from among PLLA and PDLA in the form of a block in a diene elastomer and the other in the form of a block in another diene elastomer or in the form of a homopolymer. The term "in the form of a block in a diene elastomer" means a block covalently bonded to a diene elastomer.

The melting point of the polylactides PLLA and PDLA of the elastomeric mixture according to the invention, whether they are in the form of a block in a diene elastomer or in the form of a homopolymer, is higher than the melting point of a polylactide PDLA alone or PLLA alone, which may be explained by the formation of a stereocomplex between the polylactides PLLA and PDLA. This melting point, also known as the melting point of the combination of polylactides PLLA and PDLA, is advantageously greater than or equal to 150° C.; more advantageously, it ranges from 150° C. to 250° C., even more advantageously from 175° C. to 240° C.

The elastomeric mixture according to the invention withstands large deformations before breaking but can flow at a temperature above the melting point of the combination of polylactides PLLA and PDLA.

In particular, the elastomeric mixture according to the invention has a deformation at break of at least 150%, advantageously of at least 200%, more advantageously of at least 300%, as measured by the method described before the examples, in the "Mechanical tests" section.

When the elastomeric mixture according to the invention is studied by dynamic mechanical analysis, the presence of a rubbery plateau over a broad temperature range is observed, extending from 0° C. to 175° C. for the illustrated mixtures.

The structures of the copolymers A1 and 1 and then the polylactides A2 and B2 and also the additional diene elastomer will now be described in greater detail.

III-1. Copolymers A1 and 1

In addition to the diene elastomer block, the copolymer A1 comprises:

a polylactide block PLLA or PDLA, referred to as the first block, where appropriate, one or more other polylactide blocks which are all PLLA when the first block is PLLA or which are all PDLA when the first block is PDLA, the mass percentage of the polylactide block(s) in said copolymer A1 being between 10% and 50% by weight, relative to the weight of the copolymer A1.

In addition to the diene elastomer block, the copolymer B1 comprises:

a polylactide block, referred to as the second block, which is PLLA when, in the copolymer A1, the first block is PDLA or which is PDLA when, in the copolymer A1, the first block is PLLA, where appropriate, one or more other polylactide blocks which are all PLLA when said second block is PLLA or which are all PDLA when said second block is PDLA, the mass percentage of the polylactide block(s) in said copolymer B1 being between 10% and 50% by weight, relative to the weight of the copolymer B1.

Thus, all the blocks of the copolymer A1 have the same configuration: L or D.

All the blocks of the copolymer B1 have the same configuration: L when the blocks of the copolymer A1 are of D configuration, or D when the blocks of the copolymer A1 are of L configuration.

In the copolymer A1 and/or in the copolymer 1, the mass percentage of the polylactide block(s) is advantageously between 10% and 45% by weight, more advantageously between 10% and 40% by weight, even more advantageously from 15% to 40% by weight, relative to the weight of the copolymer A1 or 1, respectively.

The copolymers A1 and B1 have properties of a thermoplastic elastomer, namely elastic properties and an ability to melt and harden, reversibly, under the action of heat, of the polylactide blocks.

Advantageously, the copolymer A1 and/or B1 comprises at least one diene elastomer block with a number-average molar mass Mn of greater than 25 000 g/mol.

The copolymer A1 and/or B1 may notably be a triblock, a comb copolymer having a diene elastomer backbone or a diblock.

In particular, the copolymer A1 and/or the copolymer B1 is chosen from:
  a triblock, of structure PLLA-diene elastomer-PLLA or of structure PDLA-diene elastomer-PDLA,
  a diblock, of structure PLLA-diene elastomer or of structure PDLA-diene elastomer,
  a comb copolymer, having a diene elastomer backbone and PLLA side blocks, or, respectively, PDLA side blocks, distributed along the backbone.

In one embodiment, the copolymer A1 is a triblock with a number-average molar mass Mn ranging from 50 000 g/mol to 300 000 g/mol.

In another embodiment, the copolymer A1 is a comb copolymer with a number-average molar mass Mn ranging from 100 000 g/mol to 600 000 g/mol.

In another embodiment, the copolymer A1 is a diblock with a number-average molar mass Mn ranging from 25 000 g/mol to 200 000 g/mol.

In one embodiment, the copolymer 1 is a triblock with a number-average molar mass Mn ranging from 50 000 g/mol to 300 000 g/mol.

In another embodiment, the copolymer 1 is a comb copolymer with a number-average molar mass Mn ranging from 100 000 g/mol to 600 000 g/mol.

In another embodiment, the copolymer 1 is a diblock with a number-average molar mass Mn ranging from 25 000 g/mol to 200 000 g/mol.

III-1.1 Diene elastomer block in a diene elastomer/polylactide A1 or 1 copolymer The term "diene elastomer" should be understood, according to the invention, as meaning any elastomer derived at least partly (i.e. a homopolymer or a copolymer) from diene monomers (monomers bearing two conjugated or non-conjugated carbon-carbon double bonds). The expression "diene elastomer that can be used in the invention" more particularly refers to a diene elastomer corresponding to one of the following categories:
  (a) any homopolymer obtained by polymerization of a conjugated diene monomer containing from 4 to 12 carbon atoms;
  (b) any copolymer obtained by copolymerization of one or more of the conjugated dienes containing from 4 to 12 carbon atoms, such as those mentioned below, with each other or with one or more ethylenically unsaturated monomers;
  (c) any homopolymer obtained by polymerization of a non-conjugated diene monomer containing from 5 to 12 carbon atoms;
  (d) any copolymer obtained by copolymerization of one or more of the non-conjugated dienes containing from 5 to 12 carbon atoms, such as those mentioned below, with each other or with one or more ethylenically unsaturated monomers;
  (e) natural rubber;
  (f) a mixture of several of the elastomers defined in (a) to (f) with each other.

As conjugated diene monomer that is suitable for the synthesis of the elastomers, mention may be made of 1,3-butadiene (hereinafter denoted butadiene), 2-methyl-1,3-butadiene, 2,3-di(C1-C5 alkyl)-1,3-butadienes, for instance 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

As non-conjugated diene monomer that is suitable for the synthesis elastomers, mention may be made of 1,4-pentadiene, 1,4-hexadiene, ethylidenenorbornene or dicyclopentadiene.

As ethylenically unsaturated monomers that are capable of participating in the copolymerization with one or more conjugated or non-conjugated diene monomers, to synthesize the elastomers, mention may be made of:
  vinylaromatic compounds containing from 8 to 20 carbon atoms, for instance styrene, ortho-, meta- or para-methylstyrene, the vinylmesitylene commercial mixture, divinylbenzene or vinylnaphthalene;
  (non-aromatic) monoolefins, for instance ethylene and α-olefins, in particular propylene or isobutene;
  (meth)acrylonitrile or (meth)acrylic esters.

Among these, the diene elastomer(s) used in the invention as block in a diene elastomer/polylactide copolymer are most particularly chosen from the group of the diene elastomers consisting of polybutadienes (abbreviated as "BRs"), synthetic polyisoprenes (IRs), natural rubber (NR), butadiene copolymers, isoprene copolymers, copolymers of ethylene and of diene, and mixtures of these polymers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), halogenated or non-halogenated butyl rubbers, and copolymers of ethylene and of butadiene (EBRs).

The diene elastomer block advantageously has a number-average molar mass Mn of greater than 25 000 g/mol, advantageously greater than or equal to 30 000 g/mol and even more advantageously greater than or equal to 40 000 g/mol.

In one embodiment, the number-average molar mass Mn of the diene elastomer block advantageously ranges from 40 000 g/mol to 250 000 g/mol, even more advantageously from 50 000 g/mol to 200 000 g/mol. This embodiment is particularly suitable for preparing tri-blocks of structure PLLA-diene elastomer-PLLA or of structure PDLA-diene elastomer-PDLA.

In another embodiment, the number-average molar mass Mn of the diene elastomer block advantageously ranges from 100 000 g/mol to 500 000 g/mol. This embodiment is particularly suitable for preparing comb copolymers, having a diene elastomer backbone and PLLA side blocks, or, respectively, PDLA side blocks, distributed along the backbone.

In another embodiment, the number-average molar mass Mn of the diene elastomer block advantageously ranges from more than 25 000 g/mol to 150 000 g/mol, advantageously from more than 40 000 g/mol to 150 000 g/mol. This embodiment is particularly suitable for preparing diblocks of structure PLLA-diene elastomer or of structure PDLA-diene elastomer.

III-1.2 Synthesis of the Copolymers A1 and 1

These copolymers A1 and 1 may be prepared by reactive extrusion.

The copolymers are in particular those obtained via the process described below.

In this process, the following are introduced into an extruder:
L-lactide or D-lactide;
a diene elastomer functionalized with at least one group bearing at least one function that is capable of initiating a ring-opening polymerization of L-lactide or of D-lactide; and
a catalytic system.

In a first embodiment, the functionalized diene elastomer is a diene elastomer functionalized with two end groups, each group bearing at least one function that is capable of initiating a ring-opening polymerization of L-lactide or of D-lactide. The copolymer that will thus be obtained will be a triblock of structure PLLA-diene elastomer-PLLA or of structure PDLA-diene elastomer-PDLA.

In this embodiment, the number-average molar mass Mn of the diene elastomer advantageously ranges from 40 000 g/mol to 250 000 g/mol, even more advantageously from 50 000 g/mol to 200 000 g/mol.

In a second embodiment, the functionalized diene elastomer is a diene elastomer functionalized with several side groups distributed along the backbone, each group bearing at least one function that is capable of initiating a ring-opening polymerization of L-lactide or of D-lactide. The copolymer that will thus be obtained will be a comb copolymer containing a diene elastomer backbone and polylactide side blocks.

In this embodiment, the number-average molar mass Mn of the diene elastomer advantageously ranges from 100 000 g/mol to 500 000 g/mol.

In a third advantageous embodiment of the invention, the functionalized diene elastomer is a diene elastomer functionalized with an end group bearing at least one function that is capable of initiating a ring-opening polymerization of L-lactide or of D-lactide. The copolymer that will thus be obtained will be a diblock of structure PLLA-diene elastomer or of structure PDLA-diene elastomer.

In this embodiment, the number-average molar mass Mn of the diene elastomer advantageously ranges from more than 25 000 g/mol to 150 000 g/mol, advantageously from more than 40 000 g/mol to 150 000 g/mol.

Functions that are capable of initiating a ring-opening polymerization of lactide are more particularly alcohol —OH or primary amine —NH$_2$ functions.

The diene elastomers functionalized with one or two end group(s) (first and third advantageous embodiments of the invention) can be prepared by different processes known to those skilled in the art, in particular by functional initiation, by termination reaction with a functionalization agent or by coupling. A process for preparing a diene elastomer functionalized with one or two amine end group(s) is described, for example, in the publication Schulz et al., Journal of Polymer Science, Vol. 15, 2401-2410 (1977).

The diene elastomer functionalized with several side groups (second advantageous embodiment of the invention) may be prepared by different processes known to those skilled in the art, in particular by grafting. The diene elastomer functionalized with nucleophilic groups along the main chain may be functionalized during a step of functionalization of the main chain of the elastomer by different techniques, for example by radical reaction, by hydrosilylation or by oxidation of the unsaturation followed by hydrogenation. The functionalization makes it possible to obtain a polymer functionalized with nucleophilic groups, advantageously primary amine or alcohol groups.

In particular, the diene elastomer may be functionalized by a radical reaction according to the process described in patent application WO 2014/095925.

During the reactive extrusion, L-lactide or D-lactide reacts with the function(s) carried by the group of the functionalized elastomer and then L-lactide or D-lactide polymerizes, by ring opening, to form one or more PLLA or, respectively, PDLA blocks.

As described previously, the groups may be side groups along the backbone or end groups. This process thus allows controlled polymerization, by growth of a polylactide chain starting from each initiating function borne by each group, side group or end group, of the diene elastomer. In said group, the function that is capable of initiating a ring-opening polymerization of lactide, also known as an initiating function, is advantageously an end function.

Advantageously, the functionalized diene elastomer is a diene elastomer functionalized with at least two identical or different groups each bearing at least one function that is capable of initiating a ring-opening polymerization of lactide, thus leading to triblock or comb copolymers.

The diene elastomer functionalized with at least two groups may notably be represented by the following formulae:

with x > 2

In these two formulae (III) and (IV), the group F is a group bearing at least one function that is capable of initiating a ring-opening polymerization of lactide. The group F may be different within the same formula.

As presented previously, the elastomers of formula (III) will lead to triblocks whereas the elastomers of formula (IV) will lead to comb copolymers.

Advantageously, the process comprises the following successive steps:
a. Introducing into an extruder L-lactide or D-lactide and said functionalized diene elastomer, also referred to as the functionalized elastomer;
b. Mixing the components introduced in step a); and then
c. Introducing the catalytic system into the mixture obtained after step b), the introduction of the catalytic system triggering the polymerization; and then
d. Introducing a catalyst inhibitor to stop the polymerization;
e. Recovering the copolymer at the outlet of the extruder.

Steps a) and b) make it possible to homogenize the mixture and to ensure that the subsequent polymerization proceeds optimally. Advantageously, during step a), all of the functionalized elastomer is introduced.

As lactide is sensitive to water and to moisture, the functionalized elastomer is advantageously dried beforehand. Advantageously, the residual water content in the diene elastomer is less than 2000 ppm, more advantageously less than 1000 ppm. Advantageously, the residual water content in the lactide is less than 500 ppm, more advantageously less than 300 ppm.

In addition, steps a) and b) are advantageously performed under anhydrous conditions, for example while flushing with an inert gas such as nitrogen, in order to prevent any homopolymerization of the lactide.

During step a), all of the L-lactide or D-lactide or a portion of the L-lactide or D-lactide may be introduced.

In a first embodiment, during step a), all of the L-lactide or D-lactide is introduced.

In a second embodiment, during step a), a portion of the L-lactide or D-lactide, advantageously at least 50% by weight, relative to the total amount of L-lactide or D-lactide, more advantageously at least 70% by weight, is introduced.

The remaining portion of the L-lactide or D-lactide will be added during step c), prior to or simultaneously with the introduction of the catalytic system.

Advantageously, the process comprises the following successive steps:
a. Introducing, into an extruder, a portion of the L-lactide or D-lactide and of said functionalized elastomer;
b. Mixing the components introduced in step a); and then
c. Introducing the remaining portion of the L-lactide or D-lactide and of the catalytic system into the mixture obtained after step b), the introduction of the catalytic system triggering the polymerization; and then
d. Introducing a catalyst inhibitor to stop the polymerization;
e. Recovering the copolymer at the outlet of the extruder.

In the process, irrespective of the embodiment, either L-lactide or D-lactide is preferably introduced, in one or more portions.

The polymerization of the L-lactide or D-lactide begins during the addition of the catalytic system. It is, of course, understood that the catalytic system comprises a catalyst which allows the ring-opening polymerization of lactide, which catalyst will be described hereinafter.

The polymerization is advantageously performed at a temperature ranging from 80° C. to 200° C., more advantageously ranging from 100° C. to 200° C., even more advantageously ranging from 150° C. to 200° C.

The process is characterized in that the polymerization is performed in an extruder. Any type of extruder which allows the mixing of components may be used: single-screw extruder, two-stage extruder or co-kneader, twin-screw extruder, planetary gear extruder or ring extruder. Twin-screw extruders are particularly suitable for use. The extruder can enable a continuous or batchwise process.

For one type of process, continuous or batchwise, the L/D (length/diameter) ratio of the extruder is adapted according to the polymerization time, which is dependent on the flow rate and on the residence time. In a continuous process, the L/D ratio may be, for example, greater than 20, more advantageously greater than 40. It may be, for example, 56 for a continuous twin-screw extruder and a polymerization time of less than 30 minutes. In a batchwise process, it may be, for example, 5 or 6 for a microextruder and a polymerization time of less than 30 minutes.

In the advantageous embodiment employing steps a) to e), these steps a) to e) are advantageously performed in the same extruder, mainly for practical reasons. However, it would be possible to envisage the use of one extruder for steps a) and b) and another extruder for steps c) to e).

The mixing in step a) is advantageously performed under weaker compounding than the mixing of the polymerization step c), notably so as not to degrade the functionalized diene elastomer during step a). A person skilled in the art knows how to adapt the rotational speed of the screws of the extruder, its design in the mixing zones as a function of the compounding which it is desired to obtain.

An inhibitor of the catalytic system is introduced during step d), of course after mixing in the preceding step for a time sufficient to achieve the desired degree of polymerization.

During step e), before recovery of the copolymer at the outlet, the process according to the invention may comprise a step of evaporation of the unreacted volatile components, in particular of the unreacted lactide.

The process according to the invention makes it possible to obtain satisfactory conversions in time periods compatible with industrial use. In particular, the polymerization time is advantageously less than 30 minutes; more advantageously, it ranges from 5 minutes to less than 30 minutes.

In the process according to the invention, it is also possible to introduce, advantageously as early as step a), an antioxidant for preventing degradation of the diene elastomer. This antioxidant can also prevent depolymerization of the polylactide blocks or of the couplings between the chains of diene elastomer/polylactide copolymers formed. The antioxidant is described hereinafter.

The polymerization is advantageously performed in bulk, i.e. without addition of supplementary solvent. The process may be continuous or batchwise.

In a first embodiment, the process is continuous. Steps a) to e) are thus simultaneous and take place in different zones of the extruder. For example, step a) is performed in a feed zone (located upstream in the extruder) and then step b) is performed in a mixing zone.

Even further downstream, the extruder comprises a zone for introduction of the catalytic system and then a mixing zone. Even further downstream, the extruder comprises a zone for introduction of the inhibitor of the catalytic system, compounding, then for evaporation of the unreacted volatile products with exit and recovery of the copolymer.

It is understood that the upstream lies in the extruder head (feed zone). With respect to a reference point, a downstream zone is a zone closer to the outlet of the extruder.

In a second embodiment, the process is batchwise. Steps a) to e) are thus spread out over time and may take place in the same zone of the extruder.

Steps a) to e) may thus be performed in cycles, the product exiting from the extrusion zone being returned as feed to the extruder. Step a) corresponds to the beginning of the first cycle. Step b) is then performed for a predetermined number of cycles. During step c), the catalytic system is introduced and then the predetermined number of cycles is performed.

During step d), the inhibitor of the catalytic system is introduced and the predetermined number of cycles for evaporating the unreacted products is then performed, before exit and recovery of the copolymer.

In order to achieve the ratios of polylactide, PLLA or PDLA, desired in the copolymer, the mass percentage of L-lactide or D-lactide introduced advantageously ranges from 12% to 55% by weight, more advantageously from 12% to 47% by weight, relative to the total weight of functionalized diene elastomer and of L-lactide or D-lactide introduced.

III-1.2.1. Catalytic System:

The polymerization reaction of the lactide by ring opening is performed in the presence of a catalytic system, such as is known to those skilled in the art.

A first example of a suitable catalytic system is the one described in patent application WO 98/02480.

This catalytic system comprises at least one catalyst and optionally at least one co-catalyst.

Preferably, the catalyst is of formula (V)

$$(M)(X^1, X^2 \ldots X^m)_n \qquad (V)$$

in which

M is a metal selected from the metals of Groups 2, 4, 8, 9, 10, 12, 13, 14 and 15 of the Periodic Table of the Elements;

$X^1, X^2 \ldots X^m$ is a substituent selected from alkyl, aryl, oxide, carboxylate, halide, alkoxy and alkyl ester groups;

m is an integer between 1 and 6, and n is an integer between 1 and 6; the values of m and n depend on the degree of oxidation of the metal ion.

The term "alkyl" denotes a saturated, linear or branched hydrocarbon-based group of 1 to 20 carbon atoms, in particular of 1 to 16 carbon atoms, in particular of 1 to 12 carbon atoms, in particular of 1 to 10 atoms and more particularly of 1 to 6 carbon atoms. By way of example, radicals such as methyl, ethyl, isopropyl, n-butyl, t-butyl, t-butylmethyl, n-propyl, pentyl, n-hexyl, 2-ethylbutyl, heptyl, octyl, nonyl or decyl are included in this definition.

The term "aryl" denotes an aromatic ring comprising from 1 to 3 optionally fused aromatic nuclei, of 6 to 20 carbon atoms, in particular of 6 to 10 carbon atoms. Examples of aryl groups that may be mentioned include phenyl, phenethyl, naphthyl and anthryl.

The term "alkoxy" denotes a group of general formula R—O— where R is an alkyl group as defined above. Examples that may be mentioned include methoxy, ethoxy, propoxy, t-butoxy, n-butoxy, isobutoxy, sec-butoxy, n-pentoxy, isopentoxy, sec-pentoxy, t-pentoxy, hexyloxy and isopropoxy groups.

The term "halide" denotes a chloride, a fluoride, an iodide or a bromide.

In Group 2, the use of Mg and Ca is preferred. In Group 4, the use of Ti, Zr and Hf may be mentioned. Within Group 8, the use of Fe is preferred. Within Group 12, the use of Zn is preferred. Within Group 13, the use of Al, Ga, In and Tl may be mentioned. Within Group 14, the use of Sn is preferred. Within Group 15, the use of Sb and Bi is preferred. Generally, the use of metals from Groups 4, 14 and 15 is preferred. It is preferable for M to be chosen from Sn, Zr, Hf, Zn, Bi and Ti. The use of a catalyst based on Sn may be particularly preferred.

For the halides, tin halides such as $SnCl_2$, $SnBr_2$, $SnCl$ and $SnBr_4$ may be mentioned. For the oxides, SnO and PbO may be mentioned. In the group of the alkyl esters, the octoates (for example 2-ethylhexanoate), the stearates or the acetates may be mentioned. In particular, Sn octanoate (also known under the name of Sn(II) bis(2-ethylhexanoate) or simply as tin octoate), tin stearate, dibutyltin diacetate, butyltin tris(2-ethylhexanoate), tin (2-ethylhexanoate), bismuth (2-ethylhexanoate), tin triacetate, sodium (2-ethylhexanoate), calcium stearate, magnesium stearate and zinc stearate may be mentioned. Mention may also be made of $Ti(OiPr)_4$, $Ti(2\text{-ethylhexanoate})_4$, $Ti(2\text{-ethylhexylate})_4$, $Zr(OiPr)_4$, $Bi(neodecanoate)_3$ or $Zn(lactate)_2$. Other suitable compounds comprise tetraphenyltin, Sb tris(ethylene glycolate), alkoxyaluminiums and alkoxyzincs.

The catalytic system may also comprise a co-catalyst, advantageously of formula (VI)

$$(Y)(R_1, R_2 \ldots R_q)_p \qquad (VI)$$

in which:

Y is an element selected from the elements of Group 15 and/or 16 of the Periodic Table, $R_1, R_2 \ldots R_q$ is a substituent selected from the group consisting of alkyls, aryls, oxides, halides, alkoxys, aminoalkyls, thioalkyls, phenyloxys, aminoaryls, thioaryls and compounds containing the elements from Group 15 and/or 16 of the Periodic Table.

q is an integer between 1 and 6, and p is an integer between 1 and 6.

Preferably, the catalytic system comprises tin bis(2-ethylhexanoate) as catalyst and triphenylphosphine $PPh_3$ as co-catalyst. The mole ratio of the co-catalyst to the catalyst may be between 1/10 and 10/1, preferably between 1/3 and 3/1. More preferably, the mole ratio of the co-catalyst to the catalyst may be 1/1.

The mole ratio of the lactide to the tin bis(2-ethylhexanoate) catalyst may range from 50/1 to 1000/1, preferably from 100/1 to 900/1, more preferably from 200/1 to 800/1.

When another catalyst is used, a person skilled in the art knows to adapt the amounts and the temperature thereof to observe the same catalytic activity.

Other catalytic systems may also be used and reference may notably be made to the article by Kamber et al. (Organocatalytic ring-opening polymerization, Nahrain E. Kamber et al., Chem. Rev., 2007, 107, 5813-5840).

Mention may also be made of the organic catalysts of the guanidine family, more particularly TBD: 1,5,7-triazabicyclo[4.4.0]dec-5-ene (Cyclic guanidine organic catalysts; what is magic about triazabicyclodecene?, Matthew K. Kiesewetter et al., J. Org. Chem., 2009, 74, 6490-9496), or N-heterocyclic olefins (Highly polarised alkenes as organocatalysts for the polymerization of lactones and trimethylene carbonate, Stefen Naumann et al., ACS Macro Lett., 2016, 5, 134-138).

III-1.2.2. Antioxidant and Polymerization Inhibitor:

In the process according to the invention, it is possible to add, as early as step a), an antioxidant.

This antioxidant is preferably sparingly nucleophilic so as not to initiate the ring-opening polymerization of lactide.

Polylactide antioxidants are notably described in U.S. Pat. No. 6,143,863 or EP 912 624. Organophosphites, such as bis(2,4-di(t-butyl)phenyl) pentaerythritol diphosphite (trade name: Ultranox® 626), are particularly effective.

Hindered phenolic antioxidants, such as Irganox® 1070, are also particularly effective. The polymerization inhibitor (cata killer) added during step d) of the process may also have an antioxidant effect.

The inhibitors of the catalytic system used in the process of the invention are known to those skilled in the art. Reference may be made, for example, to U.S. Pat. No. 6,114,495 or EP 912 624.

Mention may notably be made of the following commercial products: Irganox® 1425 or Irganox® 195, which are both phosphonates, Doverphos® S680 or Doverphos® LP09, which are both phosphites, polyacrylic acid or tartaric acid.

Finally, the functionalized elastomer introduced may comprise an antioxidant which was added at the end of the synthesis of the functionalized elastomer.

The antioxidant added at the end of the synthesis of the functionalized elastomer is any antioxidant known to be effective in preventing the ageing of elastomers attributable to the action of oxygen.

Mention may notably be made of para-phenylenediamine (abbreviated as "PPD" or "PPDA") derivatives, also referred to, in a known manner, as substituted para-phenylenediamines, for instance N-(1,3-dimethylbutyl)-N'-phenyl-p-phenylenediamine (more commonly known under the abbreviated term "6-PPD"), N-isopropyl-N'-phenyl-p- phenylenediamine (abbreviated as "I-PPD"), phenylcyclohexyl-p-phenylenediamine, N,N'-di(1,4-dimethylpentyl)-p-phenylenediamine, N,N'-diaryl-p-phenylenediamine ("DTPD"), diaryl-p-phenylenediamine ("DAPD"), 2,4,6-tris(N-(1,4-dimethylpentyl)-p-phenylenediamino)-1,3,5-triazine, and mixtures of such diamines.

Mention may also be made of substituted diphenylamines or triphenylamines, as described, for example, in patent applications WO 2007/121936, WO 2008/055683 and WO2009/138460, in particular 4,4'-bis(isopropylamino)triphenylamine, 4,4'-bis(1,3-dimethylbutylamino)triphenylamine, 4,4'-bis(1,4-dimethylpentylamino)triphenylamine, 4,4',4"-tris(1,3-dimethylbutylamino)triphenylamine or 4,4',4"-tris(1,4-dimethylpentylamino)triphenylamine.

Mention may also be made of dialkyl thiodipropionates or phenolic antioxidants, notably of the family of 2,2'-methylenebis[4-($C_1$-$C_{10}$)alkyl-6-($C_1$-$C_{12}$)alkylphenols], as described notably in patent application WO 99/02590.

Needless to say, in the present description, the term "antioxidant" may denote either a single antioxidant compound or a mixture of several antioxidant compounds.

Preferably, the antioxidant is selected from the group consisting of substituted p-phenylenediamines, substituted diphenylamines, substituted triphenylamines, and mixtures of such compounds; even more preferably, the antioxidant is selected from the group consisting of substituted p-phenylenediamines and mixtures of such diamines.

III-2. Polylactides A2 and B2

According to certain embodiments, polymer A) and/or polymer B) may also comprise, respectively, a polylactide A2 and/or B2.

The polylactide A2) and/or B2) is advantageously a homopolymer with a number-average molar mass Mn of less than 150 000 g/mol.

Preferably, the number-average molar mass Mn of the polylactide A2 and/or B2 is between 2000 g/mol and 150 000 g/mol, more preferentially between 3000 g/mol and 100 000 g/mol. Such homopolymers are commercially available.

Advantageously, only one of the two polymers A and B comprises such a polylactide A2 or, respectively, B2.

III-3. Additional Diene Elastomer

The total content of optional additional diene elastomer is within a range extending from 0 to 70 phr, advantageously from 0 to 50 phr, more advantageously from 0 to 10 phr. Very preferentially also, the elastomeric mixture does not contain any additional diene elastomer. The additional diene elastomer of the elastomeric mixture is preferentially selected from the group of diene elastomers consisting of polybutadienes, synthetic polyisoprenes, natural rubber, butadiene copolymers, isoprene copolymers and mixtures of these elastomers. Such copolymers are more preferably selected from the group consisting of styrene copolymers (SBRs, SIRs and SBIRs), polybutadienes (BRs) and natural rubber (NR). The number-average molar mass Mn of the additional diene elastomer may vary widely, for example from 20 000 g/mol to 1 000 000 g/mol.

III-4. Preparation of the Elastomeric Mixture According to the Invention:

The elastomeric mixture according to the invention comprising polymers A) and B) may be prepared in solution or in bulk.

According to one embodiment, the preparation in solution of the elastomeric mixture according to the invention comprises the preparation of a solution of polymer A) and of a solution of polymer B), where appropriate of a solution of the additional diene elastomer, followed by compounding of these solutions.

In particular, the process for preparing in solution the elastomeric mixture according to the invention comprises the following steps:
a. Dissolving a polymer A) in a solvent;
b. Dissolving a polymer B) in a solvent;
c. Mixing the two solutions obtained in step a) and b);
d. Recovering the elastomeric mixture after removing the solvents.

Preferably, the solution of polymer A) has a polymer A) concentration of between 2% and 30% by weight relative to the total weight of the solution.

Preferably, the solution of polymer B) has a polymer B) concentration of between 2% and 30% by weight relative to the total weight of the solution.

Advantageously, polymer A) or, respectively, polymer B) is in solution in a solvent that is suitable for dissolving it, for example chloroform, tetrahydrofuran, dichloromethane or toluene.

Preferably, step c) of the compounding takes place at room temperature, over a few minutes.

Alternatively, the preparation of the elastomeric mixture according to the invention comprises the bulk compounding of polymer A), of polymer B), where appropriate of the additional diene elastomer, at a temperature above the melting point of the combination of PLLA and PDLA.

In particular, the process for preparing in bulk the elastomeric mixture according to the invention comprises the following successive steps:
a. Introducing polymers A) and B) into an extruder;
b. Melt-blending the components introduced in step a); and then
c. Recovering the elastomeric mixture at the outlet of the extruder.

During step b, the mixing takes place at a temperature above the melting point of the combination of PLLA and PDLA, preferably at a temperature ranging from 150° C. to 300° C. Any type of extruder which allows the mixing of components may be used: single-screw extruder, two-stage extruder or co-kneader, twin-screw extruder, planetary gear extruder or ring extruder. Twin-screw extruders are particularly suitable for use. The extruder can enable a continuous or batchwise process.

In particular, the compounding time ranges from 2 minutes to 10 minutes, more advantageously from 3 minutes to 7 minutes.

Advantageously, the compounding speed ranges from 50 to 100 revolutions per minute (rpm), more advantageously from 60 to 90 rpm.

Preferably, the elastomeric mixture according to the invention is prepared in bulk.

III-4. Rubber Composition and Tyre

A subject of the invention is also a rubber composition comprising the elastomeric mixture according to the invention. Advantageously, the elastomeric mixture according to the invention represents at least 30% by weight of the composition, more advantageously at least 40% by weight, even more advantageously at least 50% by weight. In particular, polymers A) and B) of the elastomeric mixture may represent the predominant polymers by weight of the rubber composition or even the only polymers of the rubber composition. The amount of polymers A) and B) is within a range which advantageously extends from 30 to 100 phr, more advantageously from 50 to 100 phr and even more preferentially from 90 to 100 phr. Polymers A) and B) preferentially represent the only polymers of the rubber composition, in particular of the tread.

The rubber composition is a rubber composition that may be used in the manufacture of a tyre, in particular for the preparation of a tread. The elastomeric mixture according to the invention makes it possible to manufacture a tread which affords a very good compromise of grip and rolling resistance performance qualities. The rubber composition may comprise, in addition to the elastomeric mixture, an (i.e. one or more) additive, such as a nanometric or reinforcing filler, a plasticizer or another additive, for example one conventionally used in a tyre composition.

Nanometric or Reinforcing Filler

The elastomeric mixture comprising polymers A) and B) is sufficient by itself for the tread according to the invention to be usable.

When a reinforcing filler is used, use may be made of any type of filler commonly used for the manufacture of tyres, for example an organic filler, such as carbon black, an inorganic filler, such as silica, or a blend of these two types of filler, notably a blend of carbon black and silica.

By virtue of the presence of the composition of the invention in the rubber composition, satisfactory stiffness properties may be obtained even though the content of reinforcing filler is decreased.

To couple the reinforcing inorganic filler with the elastomeric mixture, it is possible, for example, to use an at least bifunctional coupling agent (or bonding agent) intended to provide a satisfactory connection, of chemical and/or physical nature, between the inorganic filler (surface of its particles) and the elastomeric mixture, notably difunctional organosilanes or polyorganosiloxanes.

Plasticizers

The elastomeric mixture comprising polymers A) and B) is sufficient by itself for the tread according to the invention to be usable.

However, according to a preferential embodiment of the invention, the rubber composition may also additionally include a plasticizer, such as an oil (or plasticizing or extending oil) or a plasticizing resin, the role of which is to facilitate the processing of the tread, in particular its incorporation in the tyre, by lowering the modulus and increasing the tackifying power.

Solid Plasticizer:

The solid plasticizer is a plasticizing resin.

In a manner known to those skilled in the art, the term "resin" is reserved in the present patent application, by definition, for a thermoplastic compound which is a solid at room temperature (23° C.), as opposed to a liquid plasticizing compound, such as an oil. Resins are polymers that are well known to those skilled in the art, which may be used in particular as plasticizers or tackifiers in polymer matrices. They are by nature miscible (i.e., compatible) at the contents used with the polymer compositions for which they are intended, so as to act as true diluents. They have been described, for example, in the book entitled "*Hydrocarbon Resins*" by R. Mildenberg, M. Zander and G. Collin (New York, V C H, 1997, ISBN 3-527-28617-9), Chapter 5 of which is devoted to their applications, notably in the tyre rubber field (5.5. "*Rubber Tires and Mechanical Goods*").

Liquid Plasticizer:

The plasticizer is a liquid (at 23° C.) plasticizing agent, the function of which is to soften the matrix by diluting the elastomer and the reinforcing filler; its Tg is preferentially less than −20° C., more preferentially less than −40° C.

Any extender oil, whether of aromatic or non-aromatic nature, or any liquid plasticizer known for its plasticizing properties with regard to diene elastomers, may be used. At room temperature (23° C.), these plasticizing agents or these oils, which are more or less viscous, are liquids (that is to say, as a reminder, substances which have the ability to eventually take on the shape of their container), as opposed, notably, to plasticizing resins, which are by nature solids at room temperature.

Other Additives

The rubber composition may also moreover include the various additives commonly present in compositions for tyres, in particular treads, known to those skilled in the art. One or more additives chosen from protective agents, such as antioxidants or antiozonants, UV stabilizers, various processing aids or other stabilizers, or else promoters that are capable of promoting the adhesion to the remainder of the structure of the tyre, will be chosen, for example.

In one advantageous variant of the invention, mention will most particularly be made of antioxidants or nucleating agents.

Equally and optionally, the rubber composition may contain a crosslinking system known to those skilled in the art.

When, in the elastomeric mixture, at least one of the copolymers A1 or 1 is a triblock copolymer or a comb copolymer, it is possible for the rubber composition not to contain a crosslinking system. Preferentially, the rubber composition does not contain a crosslinking system.

When, in the elastomeric mixture, the copolymers A1 or 1 (where appropriate) are diblock copolymers, the rubber composition advantageously contains a crosslinking system.

The crosslinking system may be a vulcanization system; it is preferentially based on sulfur or sulfur donors and on a primary vulcanization accelerator (preferentially 0.5 to 10.0 phr of primary accelerator). Optionally added to this vulcanization system are various known secondary vulcanization accelerators or vulcanization activators, such as zinc oxide (preferentially for 0.5 to 10.0 phr), stearic acid, guanidine derivatives (in particular diphenylguanidine) or others (preferentially for 0.5 to 5.0 phr each). The sulfur is used at a preferential content of between 0.5 and 10 phr, more preferentially between 0.5 and 5.0 phr, for example between 0.5 and 3.0 phr when the invention is applied to a tyre tread.

The rubber composition may contain one or more inert micrometric fillers, such as lamellar fillers, known to those skilled in the art. Preferably, the rubber composition does not contain any micrometric filler.

Advantageously, the rubber composition comprises several additives, in particular antioxidants, nucleating agents or fillers; as defined previously.

A subject of the invention is also a tyre, one of the constituent elements of which comprises the elastomeric mixture in accordance with the invention or the rubber composition described previously. This constituent element is advantageously the tread.

In particular, one of the constituent elements of the tyre comprises the elastomeric mixture in accordance with the invention or the rubber composition described previously.

The elastomeric mixture or the rubber composition according to the invention makes it possible to manufacture a tread which affords a very good compromise of grip and rolling resistance performance qualities.

IV— EXEMPLARY EMBODIMENTS OF THE INVENTION

Measurements and Tests Used

1. Determination of the Distribution of Molar Masses by PS Equivalent RI SEC

It is determined by polystyrene equivalent size exclusion chromatography (SEC). SEC makes it possible to separate macromolecules in solution according to their size through columns filled with a porous gel. The macromolecules are separated according to their hydrodynamic volume, the bulkiest being eluted first. Without being an absolute method, SEC makes it possible to comprehend the distribution of the molar masses of a polymer. The various number-average molar masses (Mn) and weight-average molar masses (Mw) may be determined from commercial standards and the polydispersity index (PI=Mw/Mn) may be calculated via a "Moore" calibration.

Preparation of the polymer: There is no specific treatment of the polymer sample before analysis. The latter is simply dissolved in chloroform at a concentration of approximately 2 g/l. The solution is then filtered through a filter with a porosity of 0.45 μm before injection. SEC analysis: The apparatus used is an Agilent 1200 chromatograph. The elution solvent is chloroform. The flow rate is 1 ml/min, the temperature of the system is 30° C. and the analytical time is 30 min. A set of three Agilent columns in series which are preceded by a filter, with commercial names "PLgel 10 μm (pre-column)" and two "PLgel 10 μm mixed B", is used. The volume of the solution of the polymer sample injected is 100 μl. The detector is an Agilent 1200 differential refractometer and the software for making use of the chromatographic data is the Chemstation system. The calculated average molar masses are relative to a calibration curve produced from Agilent-KIT PS commercial polystyrene standards.

2. Determination of the Composition of the Copolymers A1 and 1 by NMR

The polylactide contents in the copolymers A1 and B1 and the microstructures of the diene elastomers within the copolymer are determined by NMR analysis.

The samples (approximately 20 mg) are dissolved in 1 ml of $CDCl_3$ and introduced into a 5 mm NMR tube. The spectra are recorded on a BrOkerAvance III HD 500 MHz spectrometer equipped with a BBFO 1H-X 5 mm Z_GRD probe. The spectra are calibrated with regard to the $^1H$ signal of $CDCl_3$ at 7.20 ppm.

The quantitative $^1H$ NMR experiment used is a simple pulse sequence with a tip angle at 30° and a repetition time of 5 seconds between each acquisition. 64 accumulations are recorded at room temperature. The spectra are calibrated with regard to the $^1H$ signal of $CDCl_3$ at 7.20 ppm.

When the diene elastomer is an SBR, the signals of SBR, and also those of PLA, which will be used for the quantification, are observed:

CH of the polylactide at $\delta^1H$=5.1 ppm and $\delta^{13}C$=68.8 ppm $CH_3$ of the polylactide at $\delta^1H$=1.51 ppm and $\delta^{13}C$=16.5 ppm The samples partially soluble in $CDCl_3$ are analysed by magic angle spinning NMR HR-MAS (High Resolution—Magic Angle Spinning) in a medium swollen in deuterated chloroform. The samples (approximately 10 mg of elastomer) are introduced into a 92 μl rotor containing $CDCl_3$. The spectra are recorded on a BrQker Avance III HD 500 MHz spectrometer equipped with a $^1H/^{13}C$ HRMAS Z-GRD 4 mm dual probe.

The quantitative $^1H$ NMR experiment used is a simple pulse sequence with a tip angle at 30° and a repetition time of 5 seconds between each acquisition. 128 accumulations are recorded at room temperature. The spectra are calibrated with regard to the $^1H$ signal of $CDCl_3$ at 7.20 ppm.

The quantification method is identical to that of the soluble samples.

3. DSC (Differential Scanning Calorimetry) The melting points, enthalpies of fusion and glass transition temperatures Tg of the polymers are measured using a differential scanning calorimeter. The copolymers or the mixtures were analysed by DSC on a TA Instruments brand DSC Q200 machine under the following operating conditions: First heating from −40° C. to 230° C. (10° C./min), cooling 230° C. to −70° C. (10° C./min), second heating from −70° C. to 200° C. (10° C./min). The temperatures and enthalpies of fusion are measured on the first heating.

Method for Measuring the Degree of Crystallinity

The standard ISO 11357-3:2011 is used to determine the temperature and enthalpy of fusion and of crystallization of the polymers used by differential scanning calorimetry (DSC).

The reference enthalpy of polylactide is often given at 93 kJ/mol.

Crystallinity=$\Delta Hf/\Delta Hf_{PLA}$

4. Mechanical Tests 500 mm/Min Tensile Experiments

The breaking stress (MPa) and the breaking strain (%) are measured by tensile tests according to the international standard ASTM D638 (year 2002). All these tensile measurements are performed under the standard conditions of temperature (23±2° C.) and hygrometry (50±5% relative humidity), according to the international standard ASTM D638 (year 2002). The measurements are performed on V-type test specimens at a pull rate of 50 mm/min on a Lloyd LR 10k machine. The strain is measured by following the displacement of the crosshead.

500 mm/Min Tensile Experiments

The breaking stress (MPa) and the breaking strain (%) are measured by tensile tests according to the French standard N F T 46-002 of September 1988. All these tensile measurements are performed under the standard conditions of temperature (23±2° C. or 100° C.±2° C.) and hygrometry (50±5% relative humidity), according to the French Standard NF T40-101 (December 1979). The measurements are performed on H2 test specimens at a pull rate of 500 mm/min on a Zwick machine. The strain is measured by following the displacement of the crosshead.

The "nominal" secant moduli (or apparent stresses, in MPa) at 10% strain ("MA10") and at 100% strain ("MA100") are calculated from the measurements of stresses and strain.

The Dynamic Mechanical Analysis (DMA) in Temperature

The linear viscoelastic properties of these materials are measured by low strain (0.1%) sinusoidal elongation. The measurements are performed on a TA Instruments controlled-strain dynamic mechanical analyser (DMA) (DMA800) on test specimens of rectangular shape and of dimensions (mm): 25×5×0.5. The samples are moulded at 183° C. for 5 minutes, then cut out with a hollow punch. The elastic storage modulus E', the viscous modulus E" and the loss factor tan δ are measured during a temperature sweep, film tension mode; strain=10 μm, frequency=1 Hz, −100° C.→170° C. (3° C./min).

The following abbreviations are used:
SBR styrene/butadiene elastomer (styrene/butadiene rubber)
LA lactide
LLA L-lactide
DLA D-lactide
PLA polylactide
PLLA poly-L-lactide
PDLA poly-D-lactide
% 1,2-PB molar content of 1,2-polybutadiene (vinyl) units %1,4-PB molar content of 1,4-polybutadiene units
% PS molar content of styrene units
Mol molar
Mass by mass
DSC differential scanning calorimetry
DMA dynamic mechanical analysis
G* complex modulus in shear $G^*=(G'^2+G''^2)^{1/2}$
Sn/P $Sn(oct)_2/PPh_3$ mole ratio
Tnominal Nominal temperature of the extruder
Tmixture Measured temperature of the mixture in the extruder
Sscrews Rotational speed of the screws of the extruder
M.p.$_{PLA}$ Melting point of the polylactide phase in ° C.
$\Delta HfP_{LA}$ Enthalpy of fusion of the polylactide phase in J/g Example 1: PLLA-SBR-PLLA and
PDLA-SBR-PDLA Triblock Copolymers Obtained
by Polymerization of L-Lactide or D-Lactide on a
Di(Amine-Functionalized) SBR in Reactive
Extrusion Preparation of the Difunctionalized SBR:
Preparation of the Initiator Solution (Is):
The following are successively added to a 30 L reactor: 11.5 L of methylcyclohexane (MCH), 1 L of 4-bromo-N,N-bis(trimethylsilyl)aniline (sparged beforehand with nitrogen), 5.35 L of a 1.4 mol/L solution of s-BuLi in cyclohexane and 0.35 mol of tetramethylethylenediamine (TMED) purified beforehand over $Al_2O_3$.

The reaction is left at room temperature for 24 h. This solution is subsequently stored at 15° C.-20° C. under nitrogen before use. The solution thus obtained is named the "Is solution".

Polymerization and Coupling:
The various following constituents are successively added to a reactor: 56 L of MCH, 350 ppm of tetrahydrofuran (THF), 2.7 kg of styrene, 5 kg of butadiene, 65 mL of n-BuLi (0.1 mol/L) and 1.07 L of the Is solution.

After 50 min at 50° C., the conversion is 70%, and 0.48 equivalent (eq) of $Me_2SiCl_2$ relative to the $Li^+$ is added for the coupling. The reaction medium is stirred at 50° C. for 30 min. 0.4% by weight, relative to the weight of the elastomer, of an Irganox® 2246 (2,2'-methylenebis(6-(t-butyl)-4-methylphenol))/N-1,3-dimethylbutyl-N-phenylparaphenylene diamine (80/20 w/w) mixture is subsequently added.

Deprotection:
The deprotection conditions are as follows: hydrochloric acid is added to the polymer solution in a proportion of 2 eq of HCl/amine, and the whole is stirred for 48 hours at 80° C. Once the deprotection reaction is complete, the reaction medium is washed with water in order to extract the maximum amount of acid and to bring the pH of the aqueous phase back to 7. A sodium hydroxide solution may be used to bring the pH back above 7 (0.5 eq sodium hydroxide/HCl).

The polymer solution is subsequently stripped and the functionalized elastomer is dried in a rotary furnace under nitrogen and then in an oven at 60° C. under vacuum.

Results:
The number-average molar mass of the elastomer is 87 300 g/mol (PI=1.1) and the content of function is 0.2 mol % per elastomer chain.

The other functionalized SBRs are synthesized according to the same protocol.

The microstructures and the macrostructures of these SBRs are given in the table below:

TABLE 1

| | Macrostructure | | Microstructure | | |
|---|---|---|---|---|---|
| | Mn (g/mol) | PI | % 1,4-PB | % 1,2-PB | % PS |
| SBR-A | 68200 | 1.1 | 49.3 | 36.1 | 14.6 |
| SBR-B | 87300 | 1.1 | 63.1% | 24.1% | 12.8% |
| SBR-C | 96500 | 1.1 | 62.7% | 24.2% | 13.1% |

Preparation of the Triblocks PLA-SBR-PLA T1, T2, T3 and T4:

A DSM Xplore microextruder with a capacity of 15 g is used according to the following process for T1:
1. Introduction of the functional SBR obtained previously, dried beforehand for 12 hours under vacuum at 60° C. down to a residual water content of less than 300 ppm (11.2 g) in the micro-extruder (Tnominal=180° C., Tmixture=170° C., Sscrew=60 rpm), of 77% of 2.8 g of L- or D-lactide and of U626 (antioxidant, Ultranox® 626, bis(2,4-di-t-butylphenyl) pentaerythrityl diphosphite). The L- or D-lactide and the U626 were mixed beforehand,
2. Mixing/homogenization of the SBR and of the L- or D-lactide at Sscrew=60 rpm for 2 min,
3. Introduction of the remaining 23% of L- or D-lactide in the presence of the $Sn(oct)_2/PPh_3$ catalytic solution,
4. Polymerization of the polylactide (Tnominal=180° C., Tmixture=170° C., Sscrew=150 rpm)
5. When the torque has reached a plateau, introduction of the catalyst inhibitor (Irganox® 1425, 28 mg) to stop the polymerization.

The various operating conditions tested are given in the table below:

TABLE 2

| | Matrix | LA | SBR/LA (g/g) | [LA/$Sn(oct)_2$] mol | [SBR/$Sn(oct)_2$] mass | Sn/P (mol) | U626 (% mass · total) |
|---|---|---|---|---|---|---|---|
| T1 | SBR-A | LLA | 80/20 | 800 | 1138 | 1/1 | 0.06 |
| T2 | SBR-B | LLA | 80/20 | 700 | 373 | 1/1 | 0.06 |
| T3 | SBR-B | LLA | 60/40 | 700 | 373 | 1/1 | 0.06 |
| T4 | SBR-B | DLA | 60/40 | 700 | 373 | 1/1 | 0.06 |

For each of the triblock copolymers obtained (T1 to T4), the appearance is observed, on the $^1H$ NMR spectra, of -Ph-NH—(C=O)— proton signals at approximately 7.88 ppm, which are characteristic of the PLA-SBR-PLA sequences.

The characteristics of the synthesized triblock copolymers are reported in the table below:

TABLE 3

| | Mn polylactide (g/mol) [1] | Mn triblock (g/mol) SEC | PI triblock (SEC) | SBR/PLA (mass) $^1H$ NMR |
|---|---|---|---|---|
| T1 | 8000 | 81 300 | 1.4 | 81/19 |
| T2 | 8 300 | 112 100 | 2.3 | 84/16 |
| T3 | 22 500 | 138 700 | 3.7 | 66/34 |
| T4 | 22 500 | 150 200 | 3.7 | 66/34 |

[1] Mn of each polylactide block calulated by the following formula:

$$M_n^{block\ PLA} = \frac{1}{2} \cdot \frac{M_n^{SBR,SEC\ eq.\ PS}}{1 - \%massPLA^{NMR}} \cdot \%massPLA^{NMR}$$

The SEC chromatograms of the materials obtained are consistent with the structures targeted. The molar masses of the materials obtained are higher than that of the starting functional SBR.

Preparation of the Triblock PLLA-SBR-PLLA T5:

The tests were performed in a Collins brand twin-screw extruder, with an L/D ratio of 56 and comprising 14 independent heating zones (L/D=4), allowing continuous synthesis. The rotational speed of the screws is 70 rpm. The nominal temperatures of the barrels are given in the following table:

TABLE 4

| Barrel temperatures (° C.) | | | | | | | | | | | | | |
|---|---|---|---|---|---|---|---|---|---|---|---|---|---|
| 1 | 2 | 3 | 4 | 5 | 6 | 7 | 8 | 9 | 10 | 11 | 12 | 13 | 14 |
| 50 | 80 | 175 | 175 | 175 | 175 | 175 | 175 | 175 | 175 | 175 | 175 | 175 | 175 |

The SBR-C was synthesized by following the protocol given in Example 1.

The microstructures and macrostructures of this SBR are those of the SBR-C given in Table 1. This SBR is dried at 60° C. under air for 12 hours.

The L-lactide is introduced into barrel No. 1, the SBR-C into barrel 2 and the catalytic system into barrel No. 1 with the L-lactide. The SBR/L-lactide mass ratio is 60/40. The [LLA/Sn(oct)$_2$] mole ratio is 700 and triphenylphosphine PPh$_3$ is added in an amount which makes it possible to have an (Sn/P) mole ratio of 1/1.

The characteristics of the copolymer obtained are reported in the following table:

TABLE 5

| | Mn poly-L-lactide (g/mol)[1] | Mn triblock (g/mol) SEC | PI triblock (SEC) | SBR/PLLA (mass) $^1$H NMR |
|---|---|---|---|---|
| T5 | 15 200 | 121 300 | 3.2 | 76/24 |

[1] Mn of each poly-L-lactide block calculated by the following formula:

$$M_n^{block\ PLLA} = \frac{1}{2} \cdot \frac{M_n^{SBR,SEC\ eq.\ PS}}{1 - \%massPLLA^{NMR}} \cdot \%massPLLA^{NMR}$$

Example 2: SBR-g-PLLA Comb Copolymer Obtained by Polymerization of L-Lactide on an Alcohol-Functional SBR in Reactive Extrusion Comb-type copolymers (SBR-g-PLLA) are synthesized by polymerization of lactide, in the presence of a functional SBR (SBD-D) bearing mercapto-1-butanol groups grafted along the chain.

This functional SBR is prepared by following the following procedure:

Functionalization:

After complete dissolution of 110 g of SBR in 2.75 L of methylcyclohexane, 6.3 mL of 4-mercaptobutanol, dissolved beforehand in 135 mL of dichloromethane, are added. Once the temperature of the reaction medium is at 80° C., 1 g of lauroyl peroxide dissolved in 50 mL of methylcyclohexane is introduced with stirring. The medium is maintained at 80° C. overnight with stirring.

Two equivalents, relative to the peroxide of Irganox® 2246, are added at 80° C. After 15 minutes, two equivalents relative to the peroxide of 6-PPD are added. After cooling, one or two coagulations from methanol are performed.

The elastomer is subsequently redissolved and 0.4% by weight, relative to the elastomer, of an Irganox® 2246/6-PPD (80/20) mixture is added. The elastomer is then dried under vacuum at 50° C.

Results:

The functionalization obtained is 1.3 mol % per elastomer chain, and the mass yield obtained is 82%.

The microstructures and macrostructures of this SBR-D are given in the following table:

TABLE 6

| Macrostructure | | Microstructure (mol %) | | | |
|---|---|---|---|---|---|
| Mn (g/mol) | PI | % 1,4-PB | % 1,2-PB | % PS | % OH |
| 204 800 | 1.3 | 19.7 | 62.2 | 16.8 | 1.3 |

Polymerization conditions: the synthesis is performed in a microextruder in accordance with the experimental protocol described in Example 1.

The various operating conditions tested are given in the table below:

TABLE 7

| | SBR/LLA (g/g) | [LLA/Sn(oct)$_2$] mol | [SBR/Sn(oct)$_2$] mass | Sn/P (mol) | U626 (% mass.total) |
|---|---|---|---|---|---|
| CP1 | 60/40 | 700 | 373 | 1/1 | 0.07% |

For the comb copolymer obtained (CP1), it is observed in the $^1$H NMR spectra that the signal at 3.64 ppm has disappeared. Consequently, all the —S—(CH$_2$)$_4$—OH functions have initiated the polymerization of the lactide.

The results are given in the table below:

TABLE 8

| | Mn PLLA block[1] (g/mol) | Mn comb copolymer (g/mol) SEC | PI comb copolymer | SBR/PLLA (mass) $^1$H NMR |
|---|---|---|---|---|
| CP1 | 2300 | 229 000 | 2.1 | 63/37 |

[1]Mn of each block calculated by the following formula:

$$M_n^{block\ PLLA} = \frac{1}{\text{Number of OH functions per chain}} \cdot \frac{M_n^{SBR,SEC\ eq.\ PS}}{1 - \%massPLLA^{NMR}} \cdot \%massPLLA^{NMR}$$

Example 3: Elastomeric Mixtures Comprising a Triblock Copolymer PLLA-SBR-PLLA (Polymer A) and a Polylactide PDLA (Polymer B)

Elastomeric mixtures based on the triblock copolymers T1 and T2 synthesized in Example 1 are prepared with polylactides PDLA, the molar masses of which are given in the table below.

TABLE 9

|  | Mn (g/mol) | PI |
|---|---|---|
| PDLA 1 | 5100 | 1.8 |
| PDLA Corbion D070 | 27100 | 2.05 |
| PDLA DP400 | 87500 | 1.7 |

These polylactides are homopolymers. PDLA 1 and PDLA DP400 were synthesized by reactive extrusion by following the protocol described in patent application WO 98/02480A1. The PDLA Corbion D070 was obtained from Corbion Purac and used as obtained.

The proportion of triblock copolymers T1 or T2 and of polylactide PDLA in the elastomeric mixtures M1 to M4 is given in the table below in phr of triblock copolymer T1 or T2. The compositions are also given as mass proportions of:
SBR/total polylactide (PLLA in T1 or T2+PDLA)
SBR/PLLA blocks of the copolymer T1 or T2/PDLA homopolymer.
The SBR is the SBR provided by the copolymer T1 or T2.

TABLE 10

| Constituents | M1 | M2 | M3 | M4 |
|---|---|---|---|---|
| T1 | 100 | | | |
| T2 | | 100 | 100 | 100 |
| PDLA 1 | 23.5 | 20.5 | | |
| PDLA Corbion D070 | | | 20.5 | |
| PDLA DP400 | | | | 20.5 |
| SBR/total polylactide | 66/34 | 70/30 | 70/30 | 70/30 |
| SBR/PLLA/PDLA blocks | 65.6/15.4/19 | 69.7/13.3/17 | 69.7/13.3/17 | 69.7/13.3/17 |

The mixtures are prepared by:
Dissolving PDLA in chloroform,
Dissolving the triblock copolymer T1 or T2 in chloroform,
Mixing the two solutions in the mass proportions indicated previously,
Evaporating off the solvent without stirring,
Recovering a film (thickness=0.6 mm),
Drying at 40° C. under vacuum.
The DSC characterization of the mixtures is given in the table below.

TABLE 11

|  | M.p. PLA (° C.) | ΔHf PLA (J/g) | Crystallinity PLA (%) |
|---|---|---|---|
| M1 | 219 | 17.5 | 18.8 |
| M2 | 219 | 17.0 | 18.3 |
| M3 | 218 | 13.6 | 14.7 |
| M4 | 216 | 11.0 | 11.8 |

The DSC characterization shows:
for the mixtures M1 to M4, the presence of stereocomplexed polylactide phase as witnessed by the melting points of 216 to 219° C. of the crystalline phase,
for the mixtures M1 to M4, the absence of melting peaks at lower temperature, which would have been characteristic of crystalline phases of non-stereocomplexed polylactides,
that the stereocomplex formation is more difficult (decrease of the enthalpy of fusion of the polylactide between M2 and M4) with the increase in the molar mass of the PDLA.

Figure 1:
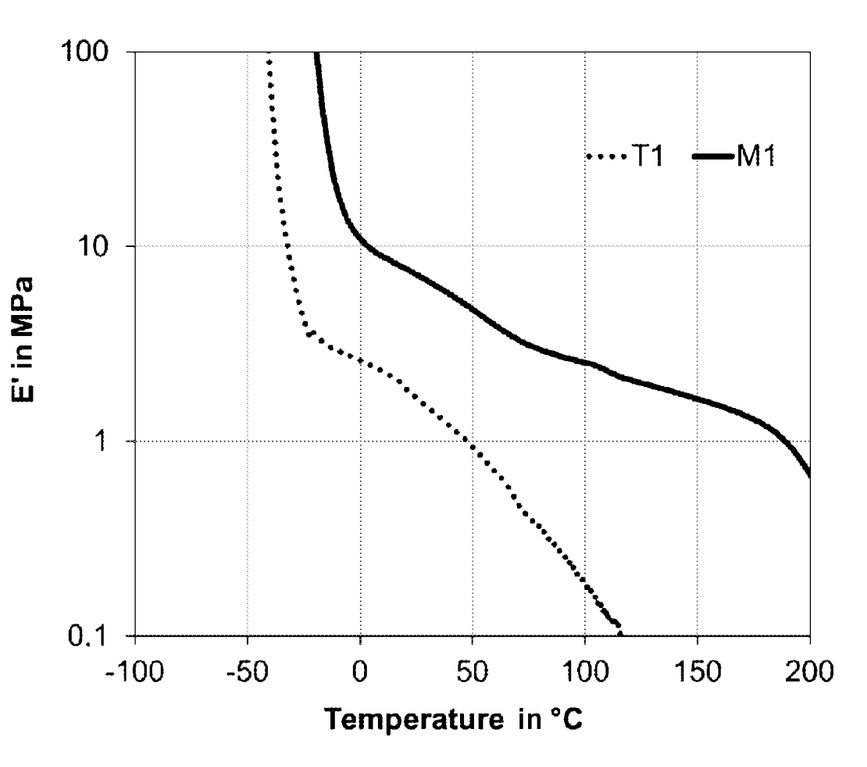
FIG. 1 is a diagram of the elastic storage modulus E' (MPa) as a function of the temperature (° C.) obtained by DMA (dynamic mechanical analysis) characterization of the triblock T1 (dashed line) and of the composition M1 (solid line).

FIG. 1 shows the DMA characterizations of the triblock copolymer T1 and of the mixture M1. A rubber plateau which extends over a broader temperature range is observed for the mixture M1, this plateau extending up to 175° C.

Example 4: Elastomeric Mixtures Comprising a Triblock Copolymer PLLA-SBR-PLLA (Polymer A) and a Triblock Copolymer PDLA-SBR-PDLA (Polymer B)

50% by weight of triblock T3 and 50% by weight of the triblock T4 are mixed, the percentages being expressed relative to the total weight T3+T4.

These mixtures may be prepared in solution or in bulk.

The following table gives, for the elastomeric mixtures M5 and M6, the proportion of copolymers in phr and the mass proportions of:
total SBR/total polylactide (PLLA blocks in T3+PDLA blocks in T4),
total SBR/PLLA blocks in T3/PDLA blocks in T4.
The total SBR corresponds to the SBR provided by the copolymers T3 and T4.

TABLE 12

| Constituents | M5 | M6 |
|---|---|---|
| T3 | 50 | 50 |
| T4 | 50 | 50 |
| Total SBR/total polylactide | 66/34 | 66/34 |
| Total SBR/PLLA blocks/PDLA blocks | 66/17/17 | 66/17/17 |

Example 4.1: Preparation in Solution

Preparation of the elastomeric mixture M5:
Dissolving the triblock copolymer T3 in chloroform,
Dissolving the triblock copolymer T4 in chloroform,
Mixing the two solutions in the mass proportions T3/T4 50/50,
Evaporating off the solvent without stirring,
Recovering a film (thickness=0.6 mm),
Drying at 40° C. under vacuum.
The results of the DSC characterization of M5 and those of T3 and T4 for comparative purposes are given in the following table:

TABLE 13

|  | M.p. PLA (° C.) | ΔHf PLA (J/g) | Crystallinity PLA (%) |
|---|---|---|---|
| T3 | 169 | 13.1 | 14.1 |
| T4 | 169 | 12.1 | 13.1 |
| M5 | 218 | 35 | 37.6 |

The DSC characterization of M5 shows the formation of stereocomplexed polylactide phases, as witnessed by the melting point of 218° C. of the crystalline phase and the enthalpy of fusion of M5 which is greatly increased relative to that observed for T3 or T4.

Example 4.2: Preparation in Bulk of the Elastomeric Mixture M6

The triblock copolymers T3 and T4 are mixed in a DSM horizontal micro-extruder (V=7.5 cm³) according to the following procedure:

introduction of the triblock copolymers T3 and T4 into the micro-extruder and mixing at a speed of 30 rpm for 1 minute at 190° C., mixing of the two triblock copolymers T3 and T4 at 190° C. at a speed of 75 rpm for 4 minutes, recovery of the material, pressing for 4 minutes at 200° C. and then for 4 minutes at 235° C. to form a plaque (thickness: 0.6 mm) used in the following characterization tests.

The elastomeric mixture obtained is named M6.

The DSC results are presented in the following table.

TABLE 14

|     | M.p. PLA (° C.) | ΔHf PLA (J/g) | Crystallinity PLA (%) |
| --- | --- | --- | --- |
| M6 | 220 | 18.5 | 19.9 |

A stereocomplexed polylactide phase with a high melting point is observed for M6.

The tensile properties at 23° C. and 90° C., each time at 50 mm/min, of the mixtures M5 and M6 are given in the following table, along with the properties of T3 for comparative purposes.

TABLE 15

|     | Breaking stress at 23° C. (%) (MPa) | Breaking strain at 23° C. (%) (%) | Breaking stress at 90° C. (MPa) | Breaking strain at 90° C. (%) |
| --- | --- | --- | --- | --- |
| T3 | 7.2 | 330 | 0.2 | 100 |
| M5 | 7.5 | 330 | 2 | 220 |
| M6 | 10.5 | 450 | 2 | 120 |

The breaking strain and breaking stress properties at 23° C. are equivalent to or better than those observed for T3. However, at 90° C., the breaking properties, in particular the breaking stresses, are improved by a factor of 20 relative to those obtained with T3.

Example 5: Elastomeric Mixture of Comb Copolymer SBR-g-PLLA (Polymer A) and of Triblock Copolymer PDLA-SBR-PDLA (Polymer B)

50% by weight of comb copolymer CP1 and 50% by weight of the triblock copolymer T4 are mixed.

The following table gives, for the mixture M7, the proportion of copolymers in phr and the mass proportions of:

total SBR/total polylactide (PLLA blocks in CP1+PDLA blocks in T4), total SBR/PLLA blocks in CP1/PDLA blocks in T4.

The total SBR corresponds to the SBR provided by the copolymers CP1 and T4.

TABLE 16

| Constituents | M7 |
| --- | --- |
| CP1 | 50 |
| T4 | 50 |
| Total SBR/total polylactide | 66.5/33.5 |
| Total SBR/PLLA/PDLA | 66.5/16.5/17 |

The elastomeric mixture M7 is prepared from CP1 and T4 by mixing in a DSM horizontal micro-extruder (V=7.5 cm³) according to the following procedure:

introduction of the two copolymers CP1 and T4 into the micro-extruder and mixing at a speed of 30 rpm for 1 minute at 190° C., mixing of the two copolymers CP1 and T4 at 190° C. at a speed of 75 rpm for 4 minutes, recovery of the material, pressing at 235° C. to form a plaque (thickness: 0.6 mm) used in the following characterization tests.

The elastomeric mixture obtained is named M7.

From the DSC characterizations reported in the following table, the melting point is 210° C.

TABLE 17

|     | M.p. PLA (° C.) | ΔHf PLA (J/g) | Crystallinity PLA (%) |
| --- | --- | --- | --- |
| M7 | 210 | 17.0 | 18.3 |

The tensile properties at 23° C. and 90° C., each time at 50 mm/min, of the mixture M7 are given in the following table.

TABLE 18

|     | Breaking stress at 23° C. (MPa) | Breaking strain at 23° C. (%) | Breaking stress at 90° C. (MPa) | Breaking strain at 90° C. (%) |
| --- | --- | --- | --- | --- |
| M7 | 11.8 | 250 | 2.5 | 130 |

The breaking properties at 90° C., in particular the breaking stress, are very satisfactory.

Example 6: Rubber Compositions Based on a Triblock Copolymer PLLA-SBR-PLLA (Polymer A) and a PDLA Homopolymer (Polymer B)

The rubber composition CT1 is a control composition based on a triblock copolymer T5 as sole source of polylactide. Thus, the rubber composition CT1 does not comprise any elastomeric mixture according to the invention. Specifically, the rubber composition CT1 does not comprise any PDLA.

Rubber compositions C11 to C14 based on an elastomeric mixture according to the invention were prepared from a triblock copolymer T5 and from two commercial PDLA polylactides from Corbion Purac, D070 and D120, in various proportions reported in the following table.

The polylactide Corbion Purac D070 is as defined in Example 3.

The polylactide Corbion Purac D120 has a number-average molecular mass of 84 900 g/mol and a polydispersity index of 2.11.

The rubber composition CC1 is a comparative composition prepared from a mixture comprising a triblock copolymer T5 and a commercial PDLA polylactide from Corbion Purac, D070. The mixture comprises more than 50% of polylactide rigid phase and no longer has elastomeric properties.

The rubber compositions CT1, C11, C12, C14 and CC1 are obtained according to the following procedure:

The mixer used is a Haake Rheomix mixer equipped with an 85 cm³ bowl and a CAM rotor. The bowl temperature of the mixer is set at 15° C., the rotation speed of the rotors at 70 rpm and the filling coefficient is set at 0.7.

At t=0 s, the triblock T5 is introduced into the mixer, followed after 1 minute by N-(1,3-dimethylbutyl)-N-phenyl-p-phenylenediamine (6-PPD) and, where appropriate, PLA in the proportions given in the following table. The whole is blended for 5 minutes and the mixture is recovered.

The compositions thus obtained are then formed into plaques (thickness of 2 to 3 mm) for 5 minutes at 180° C. for composition CT1 and at 230° C. for compositions CI1, CI2, CI4 and 001 under a press (10 t) for measurement of their mechanical properties.

TABLE 19

| Components | CT1 | CI1 | CI2 | CI4 | CC1 |
|---|---|---|---|---|---|
| T5 | 100 phr | 100 phr | 100 phr | 100 phr | 100 phr |
| PDLA Corbion D070 | | 30 phr | 13 phr | | 70 phr |
| PDLA Corbion D120 | | | | 30 phr | |
| 6-PPD | 2 phr | 2 phr | 2 phr | 2 phr | 2 phr |
| SBR/total polylactide | 76/24 | 58/42 | 67/33 | 58/42 | 45/55 |
| SBR/PLLA/PDLA | 76/24/0 | 58/19/23 | 67/21/11 | 58/19/23 | 45/14/41 |

The DSC results are presented in the following table. Depending on the composition, two peaks are present in the DSC thermograms: a peak at about 165° C. characteristic of the melting of PLLA or PDLA homo-crystallites and a peak at about 225° C. characteristic of the melting of PLLA/PDLA stereocomplexes.

TABLE 20

| | M.p. polylactide peak 1 (° C.) | ΔHf polylactide peak 1 (J/g) | Crystallinity polylactide peak 1 (%) | M.p. polylactide peak 2 (° C.) | ΔHf polylactide peak 1 (J/g) | Crystallinity polylactide peak 1 (%) |
|---|---|---|---|---|---|---|
| CT1 | 166 | 8.8 | 9.5 | — | — | — |
| CI1 | — | — | 0.0 | 224 | 42.7 | 45.9 |
| CI2 | 160 | 3.7 | 4.0 | 227 | 21.6 | 23.2 |
| CI4 | — | — | 0.0 | 227 | 39.8 | 42.8 |
| CC1 | 165 | 3.5 | 3.8 | 230 | 34.0 | 36.6 |

The rubber compositions C11, C12 and C14 and CC1 all have a main melting point increased by at least 50° C. relative to the control composition CT1. The enthalpy of fusion and the crystallinity of the polylactide are also greatly increased. On the other hand, the Tg of the central SBR block is not modified following the addition of PDLA and remains at −39° C.

Tensile mechanical properties at large strains at 23° C. and at 500 mm/min: the results are differences in properties given as percentages relative to the properties of the reference composition CT1.

Difference=(value for CIn−value for CT1)/value for CT1; CIn denoting C11, C12 or C14; or
Difference=(value for CC1−value for CT1)/value for 001.

TABLE 21

| | CT1 | CI1 | CI2 | CI | CC1 |
|---|---|---|---|---|---|
| Breaking strain difference (%) | 0% | −77% | −40% | −85% | −100% |
| Breaking stress difference (%) | 0% | 31% | 44% | 75% | −100% |
| MA10 difference (%) | 0% | 116% | 69% | 291% | −100% |

The rubber compositions C11, C12 and C14 have an improved stiffness (10% modulus MA10) and an improved breaking stress at 23° C.

The composition CC1 does not have any elastomeric properties: the test specimens break below 10% strain.

Example 7: Crosslinked Rubber Compositions Based on a Triblock Copolymer PLLA-SBR-PLLA (Polymer A) and a PDLA (Polymer B)

The rubber composition CT2 is a control composition based on a triblock copolymer T5 as sole source of polylactide. Thus, the rubber composition CT2 does not comprise any elastomeric mixture according to the invention. Specifically, the rubber composition CT2 does not comprise any PDLA.

The rubber composition C13 is a composition according to the invention based on an elastomeric mixture according to the invention. It is prepared from a triblock copolymer T5, commercial PDLA Corbion Purac D070 (as defined in Example 3) and an SBR elastomer. The rubber compositions CT2 and C13 are prepared according to the following procedure: The mixer used is a Haake Rheomix mixer equipped with an 85 cm$^3$ bowl and a CAM rotor. The bowl temperature of the mixer is set at 150° C., the rotation speed of the rotors at 70 rpm and the filling coefficient is set at 0.7.

At t=0 s, the triblock T5 is introduced into the mixer, followed after 1 minute by the other constituents of the formulation with the exception of the sulfur and CBS, in the proportions given in the following table. The whole is blended for 4 minutes and the sulfur and CBS constituents are then introduced. The whole is blended for a further 1 minute and the mixture is recovered.

The compositions thus obtained are then formed and cured into plaques (thickness of 2 to 3 mm) for 30 minutes at 180° C. for composition CT2 and at 230° C. for composition C13 under a press (10 t) for measurement of their mechanical properties.

The compositions tested are described in detail in the table which follows, given that:

(1) Triblock copolymer T5 as described above,
(2) Non-functional SBR having an Mn of 150 000 g/mol, a PI=1.9, and having a percentage of styrene of 26% by mass and of 1,2-vinyl of 18% by mass,
(3) PDLA homopolymer Corbion Purac D070,
(4) N-1,3-dimethylbutyl-N-phenyl-para-phenylenediamine (6-PPD),
(5) Stearic acid,
(6) ZnO,
(7) Sulfur,
(8) CBS=N-cyclohexyl-2-benzothiazyl sulfenamide.

total SBR=SBR+SBR in T5
total polylactide=PDLA+PLLA in T5

TABLE 22

| Components | CT2 | CI3 |
|---|---|---|
| T5 (1) | 100 | 100 |
| SBR (2) | | 70 |
| PDLA D070 (3) | | 30 |
| 6-PPD (4) | 2 | 2 |
| Stearic acid (5) | 2 | 2 |
| ZnO (6) | 3 | 3 |
| Sulfur (7) | 1 | 1 |
| CBS (8) | 2 | 2 |

TABLE 22-continued

| Components | CT2 | CI3 |
|---|---|---|
| Total SBR/total polylactide | 76/24 | 73/27 |
| Total SBR/PLLA/PDLA | 76/24/0 | 73/12/15 |

The DSC results are presented in the following table.

TABLE 23

| | M.p. PLA (° C.) | ΔHf PLA (J/g) | Crystallinity PLA (%) |
|---|---|---|---|
| CT2 | 166 | 8.8 | 9.5 |
| CI3 | 216 | 14.3 | 15.3 |

The composition CI3 has a main melting point increased by at least 50° C. relative to the control composition CT2 despite the crosslinking of the elastomeric phase. The enthalpy of fusion and the crystallinity of the polylactide are also greatly increased.

Tensile Mechanical Properties at Large Strains at 23° C. and 90° C., in Both Cases at 500 Mm/Min:

TABLE 24

| | CT2 | CI3 |
|---|---|---|
| Breaking strain at 23° C. | 660 | 790 |
| Breaking stress at 23° C. | 3.2 | 3.3 |
| MA 10 at 23° C. | 5.9 | 6.3 |
| Breaking strain at 90° C. | — | 480 |
| Breaking stress at 90° C. | — | 0.8 |
| MA 10 at 90° C. | — | 2.4 |

The composition CI3 has a stiffness (10% modulus MA10) at 23° C. similar to that of the composition CT2 comprising the crosslinked triblock T5, and improved breaking properties, in particular the breaking strain.

Furthermore, the composition CI3 has elastomeric properties up to 90° C. with breaking strains beyond 400%, unlike the crosslinked control composition CT2 which breaks at a strain of less than 10%.

The invention claimed is:

1. An elastomeric mixture comprising at least:
polymer A comprising at least one diene elastomer/polylactide copolymer A1, the copolymer A1 comprising:
a diene elastomer block having a number-average molar mass Mn of greater than 25 000 g/mol and a polylactide block PLLA or PDLA, and optionally one or more other polylactide blocks which are all PLLA when the polylactide block is PLLA or which are all PDLA when the polylactide block is PDLA, the mass percentage of polylactide blocks in copolymer A1 being between 10% and 50% by weight, relative to a weight of the copolymer A1; and
polymer B comprising:
a diene elastomer block having a number-average molar mass Mn of greater than 25 000 g/mol and a diene elastomer/polylactide copolymer B1, the copolymer B1 comprising another polylactide block, which is PLLA when, in the copolymer A1, the polylactide block is PDLA, or which is PDLA when, in the copolymer A1, the polylactide block is PLLA, and optionally one or more other polylactide blocks which are all PLLA when the another polylactide block is PLLA or which are all PDLA when the another polylactide block is PDLA, the mass percentage of polylactide blocks in copolymer B1 being between 10% and 50% by weight, relative to the weight of the copolymer B1, or
a polylactide B2 which is PLLA when, in the copolymer A1, the first polylactide block is PDLA, or which is PDLA when, in the copolymer A1, the first polylactide block is PLLA, or
a mixture of copolymer B1 and polylactide B2,
wherein PLLA and PDLA denote a chain consisting of units of formula (I)

—[CH(CH$_3$)—C(O)—O]— (I)

of which at least 70% by weight are, respectively, of L and D configuration.

2. The elastomeric mixture according to claim 1, wherein a mass content of units of formula (I) is less than 50% by weight relative to the total weight of the elastomeric mixture.

3. The elastomeric mixture according to claim 1, wherein polylactide B2 has a number-average molar mass Mn of less than 150 000 g/mol.

4. The elastomeric mixture according to claim 1, wherein polymer B comprises at least copolymer B1.

5. The elastomeric mixture according to claim 1, wherein copolymer A1 or copolymer B1 is selected from:
a triblock, of structure PLLA-diene elastomer-PLLA or of structure PDLA-diene elastomer-PDLA,
a diblock, of structure PLLA-diene elastomer or of structure PDLA-diene elastomer, and
a comb copolymer, having a diene elastomer backbone and PLLA side blocks, or, respectively, PDLA side blocks, distributed along the backbone.

6. The elastomeric mixture according to claim 1, wherein copolymer A1 is a triblock with a number-average molar mass Mn ranging from 50 000 g/mol to 300 000 g/mol.

7. The elastomeric mixture according to claim 1, wherein copolymer A1 is a comb copolymer with a number-average molar mass Mn ranging from 100 000 g/mol to 600 000 g/mol.

8. The elastomeric mixture according to claim 1, wherein copolymer A1 is a diblock with a number-average molar mass Mn ranging from 25 000 g/mol to 200 000 g/mol.

9. The elastomeric mixture according to claim 1, wherein copolymer B1 is a triblock with a number-average molar mass Mn ranging from 50 000 g/mol to 300 000 g/mol.

10. The elastomeric mixture according to claim 1, wherein copolymer B1 is a comb copolymer with a number-average molar mass Mn ranging from 100 000 g/mol to 600 000 g/mol.

11. The elastomeric mixture according to claim 1, wherein copolymer B1 is a diblock with a number-average molar mass Mn ranging from 25 000 g/mol to 200 000 g/mol.

12. The elastomeric mixture according to claim 1, wherein, in copolymer A1, in copolymer B1 or in both copolymer A1 and copolymer B1, the diene elastomer is selected from the group consisting of polybutadienes, synthetic polyisoprenes, natural rubber, butadiene copolymers, isoprene copolymers, copolymers of ethylene and diene, and mixtures thereof.

13. The elastomeric mixture according to claim 1, wherein polymers A and B represent at least 30% by weight of the elastomeric mixture.

14. A rubber composition comprises the elastomeric mixture according to claim 1 and an additive.

15. A tire comprising an elastomeric mixture according to claim 1.

* * * * *